United States Patent
Tart, Jr.

(10) Patent No.: US 7,628,193 B1
(45) Date of Patent: Dec. 8, 2009

(54) PORTABLE TIRE CHANGER

(76) Inventor: Joseph Samuel Tart, Jr., 1460 S. Sedgefield Dr., Winston-Salem, NC (US) 27107

( * ) Notice: Subject to any disclaimer, the term of this patent is extended or adjusted under 35 U.S.C. 154(b) by 67 days.

(21) Appl. No.: 11/545,306

(22) Filed: Mar. 7, 2007

(51) Int. Cl.
*B60C 25/04* (2006.01)

(52) U.S. Cl. .................. 157/1.3; 157/1.1; 157/1.35; 157/1.36

(58) Field of Classification Search .......... 157/1.1, 157/1.3, 1.35, 1.36
See application file for complete search history.

(56) References Cited

U.S. PATENT DOCUMENTS

| | | | | |
|---|---|---|---|---|
| 2,547,474 A | * | 4/1951 | La Munyon | 254/131 |
| 4,947,918 A | * | 8/1990 | Unrau | 157/1.22 |
| 4,995,439 A | * | 2/1991 | Burge | 157/1.17 |
| 5,472,034 A | * | 12/1995 | Corghi | 157/1.24 |
| 6,991,018 B2 | * | 1/2006 | Kliskey | 157/1 |
| 7,163,041 B1 | * | 1/2007 | Tran | 157/1.3 |
| 7,261,136 B1 | * | 8/2007 | Kliskey | 157/1.3 |

OTHER PUBLICATIONS

John Bean Model 7600/7700 Tire Changer Operators Manual; related technology; undated.

* cited by examiner

*Primary Examiner*—Joseph J Hail, III
*Assistant Examiner*—Shantese McDonald
(74) *Attorney, Agent, or Firm*—MacCord Mason PLLC

(57) ABSTRACT

Systems for removing a tire from a rim are shown and described. In one embodiment, the system comprises a substantially flat base. A centerpiece is configured to attach to the base. A primary lever having a tire-interface portion at one end, a handle at the opposite end, and a centerpiece-attachment in between the tire-interface the said handle is also a component of the system. The primary lever is configured to attach to the centerpiece in a manner that allows the primary lever to rotate relative to the centerpiece.

16 Claims, 5 Drawing Sheets

PORTABLE TIRE CHANGER

BACKGROUND (1) Field of Technology

The present invention relates generally to tire changing, and more particular to a portable system for changing tires.

(2) Description of the Related Art

The use of industrial tire changers, such as Models 7600/7700, available from John Bean having United States Offices located in Conway, Ark., is known in the art. While satisfactorily able to remove tires from rims, these traditional devices are expensive, large, heavy, dangerous to operate, and expensive to fix.

Thus what is needed is an inexpensive, portable, and reliable system for removing tires from rims. It is to these and other problems that the present invention is directed.

SUMMARY

In summary, one embodiment of the present invention includes a system for removing a tire from a rim. The system comprises a substantially flat base. A centerpiece is configured to attach to the base. A primary lever having a tire-interface portion at one end, a handle at the opposite end, and a centerpiece-attachment in between the tire-interface the said handle is also a component of the system. The primary lever is configured to attach to the centerpiece in a manner that allows the primary lever to rotate relative to the centerpiece.

The system may further include a secondary press-down lever. The secondary press-down lever includes a hook-like portion at one end, which is configured to engage a portion of a rim. A handle is at the opposite end. The secondary lever also includes a press-down bar attached to the lever on the opposite side of the hook-like portion. This configuration allows the hook-like portion to engage the rim, or the edge of a rim, and by the downward application of force to the handle, allows the press-down bar to push on the tire, thereby separating the tire from the rim.

The system may further include at least one hole spike attachable to the base and configured to engage at least one rim hole of a rim positioned on the centerpiece to help prevent a tire positioned on the system from rotating.

The present invention also includes other embodiments. By way of example, in another embodiment, the system includes a substantially flat base defining at least a first hole and a second hole. A centerpiece configured to be positioned above the first hole of the base. At least one hole spike is configured to be attachable to the base through the second hole. The at least one hole spike is also configured to engage at least one rim hole of a rim positioned on the centerpiece, thereby preventing the rim from rotating relative to the base. A primary lever is also a part of this embodiment. The primary lever has a tire-interface portion at one end, a handle at the opposite end, and a centerpiece-attachment in between the two ends. The centerpiece-attachment is configured to releasably attach to the centerpiece in a manner that allows the primary lever to rotate relative to the centerpiece. The primary lever is also configured such that the distance between the tire-interface and the centerpiece-attachment of the lever is sufficient to allow the tire-interface to contact a tire positioned on the base. The primary lever is also configured to rotate relative to the centerpiece.

These and other aspects of the present invention will become apparent to those skilled in the art after a reading of the following description of the preferred embodiment when considered with the drawings. It is also apparent that the above summary was intended to summarize certain embodiments of the present invention. Embodiments of the invention will be set forth in more detail, along with discussions of operation, in the figures and detailed description below. It will be apparent, however, that the detailed description is not intended to limit the present invention, the scope of which should be properly determined by the appended claims.

DESCRIPTION OF THE PREFERRED EMBODIMENTS

Figure 1A:
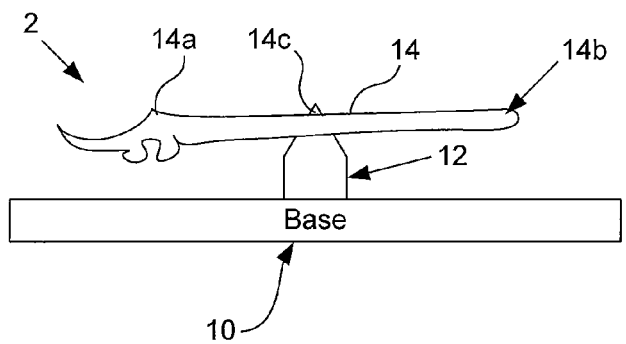
FIG. 1a shows a side view of one embodiment of a system according to the present invention.
Figure 1B:
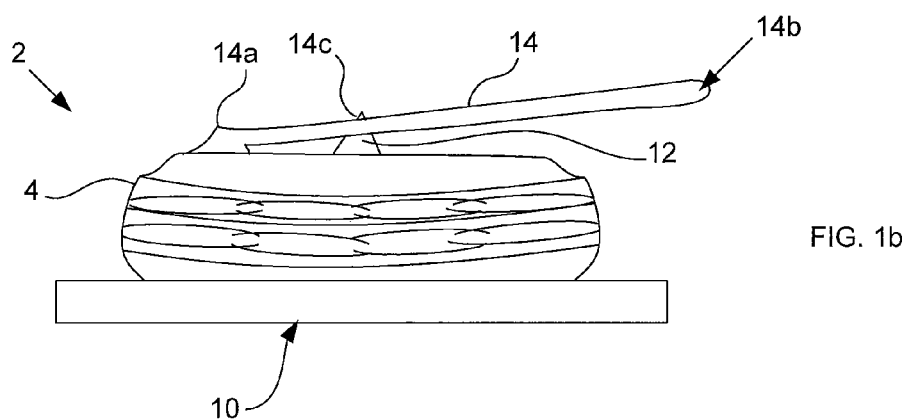
FIG. 1b shows a side view of one embodiment of a system with a tire having a rim contained thereon.
Figure 1C:
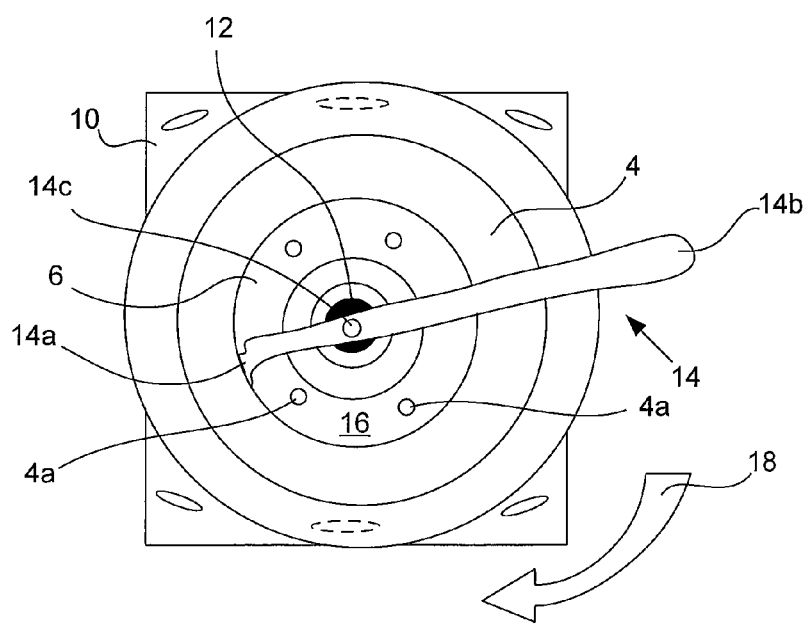
FIG. 1c shows a top view of the system and tire shown in FIG. 1b.

FIG. 1a shows a side view of one embodiment of a system, system 2, of the present invention. FIG. 1b shows system 2 having tire 4 mounted thereon. FIG. 1c shows a top view of system 2 having tire 4 mounted thereon. In FIG. 1c, rim 6 of tire 4 is also visible.

Referring generally to FIGS. 1a, 1b, and 1c, system 2 of the present invention includes a substantially flat base 10, a centerpiece 12 configured to attach to base 10, and a primary lever 14 configured to attach to centerpiece 12. Primary lever 14 includes a tire-interface portion 14a at one end and a handle 14b at the opposite end. Primary lever 14 also includes a centerpiece-attachment 14c in between tire-interface 14a and handle 14b. Centerpiece-attachment 14c is configured to attach to centerpiece 12 in a manner that allows primary lever 14 to rotate relative to centerpiece 12. Hole spike 16 is shown positioned in a rim hole 4a of tire 4.

Figure 2A:
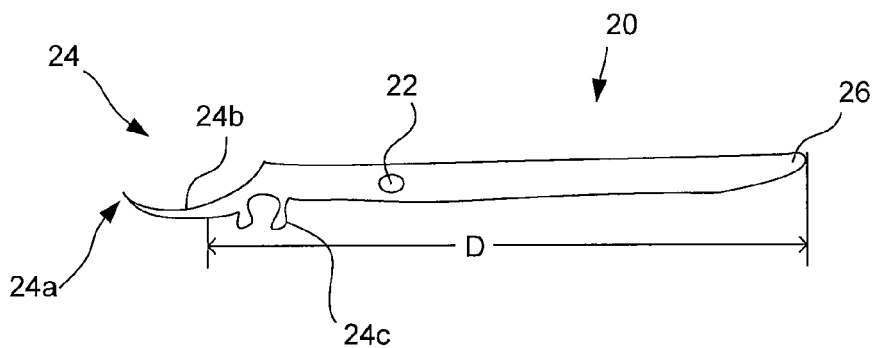
FIGS. 2a, 2b and 2c show various embodiments of primary levers of the present invention.
Figure 2B:
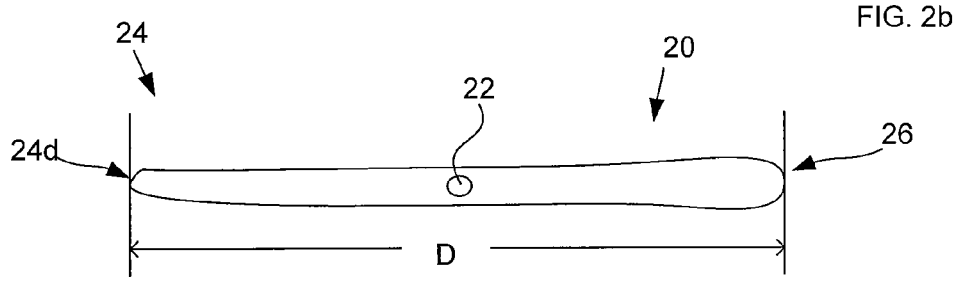
Figure 2C:
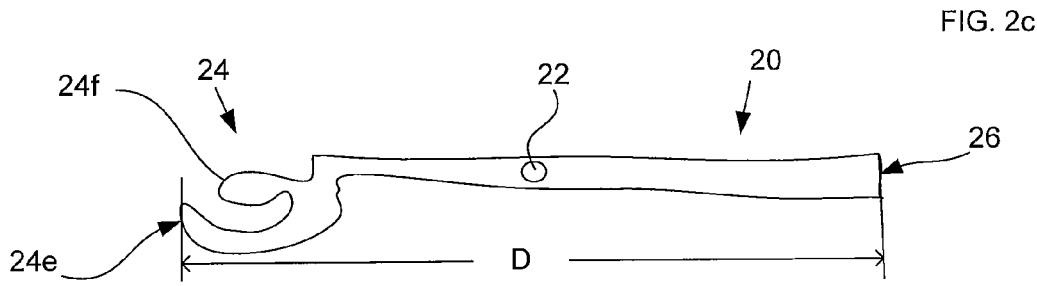

FIGS. 2a-2c show a variety of primary levers according to various embodiments of the invention. Primary levers are levers designed to rotate relative to centerpiece, e.g., relative to centerpiece 12 shown in FIG. 1a. Referring generally to FIGS. 2a-2c, primary levers 20 include centerpiece-attachments 22, which are preferably apertures defined by the levers. As seen, primary levers may have a variety tire-interfaces 24. Primary levers also include a handle-end 26.

Preferably the distance between tire interfaces 24 and centerpiece-attachments 22 is sufficient to allow tire-interfaces 24 to contact a tire positioned on a base of the present invention when the centerpiece-attachment of lever is attached to the centerpiece. Primary levers 20 will also preferably have a length D, for example between the tire-interface 24 and the handle-end, of about 30 inches. A variety of primary levers may be used either alone or in combination.

For example, FIG. 2a shows a primary lever having a tire-interface that defines a hook-like point 24a with a smooth loop section 24b. On the back of the bar is a rim fitting 24c, that is used to help remove the tire from the rim. Applicant also refers to this embodiment of the primary lever as a tire break-away bar lever. In some embodiments, it will be about 32 inches in length.

FIG. 2b shows another primary lever having a tire-interface 24 that defines a rounded shape 24d. Applicant also refers to this embodiment of the primary lever as an extra tire remover bar lever. In some embodiments it will be about 32 inches long and made of iron.

FIG. 2c shows another primary lever having a tire-interface 24 that defines a hook-like fitting 24e with a thumb-like piece 24f over the hook section. Applicant also refers to this embodiment of the primary lever as a tire separation bar. In some embodiments it will be about 32 inches long.

Figure 2D:
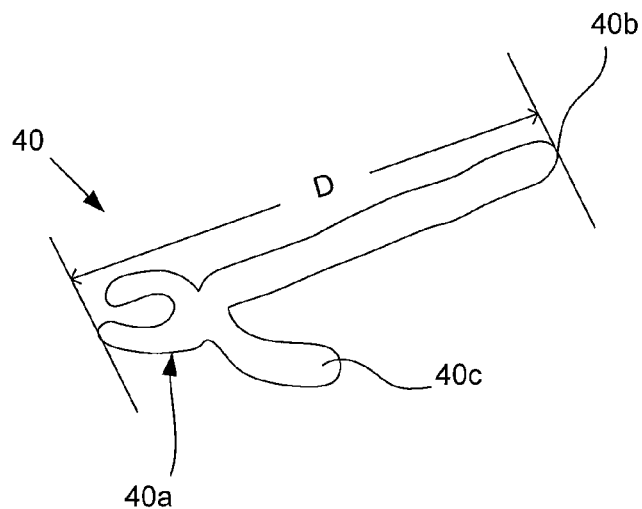
FIG. 2d shows one embodiment of a secondary lever of the present invention.

FIG. 2d shows an embodiment of a secondary press-down lever 40, also previously described as a tire press down bar lever. Secondary press-down lever 40 includes a hook-like portion 40a at one end, which is configured to engage the edge of a rim. Handle 40b is positioned on the end of the lever opposite portion 40a. Press-down bar 40c is attached to same end of the lever as hook-like portion 40a and will preferably be on the opposite side of the lever from portion 40a. In operation, hook-like portion 40a can be inserted onto the edge of a rim, and by applying force to handle 40b, press-down bar 40c will push down into a tire, thereby separating the tire from the rim. In some embodiments this lever will be about 30 inches long and the press-down bar will be about 5 inches long. The angle between the handle and the pressdown bar 40c may be about 75 degrees.

Figure 3A:
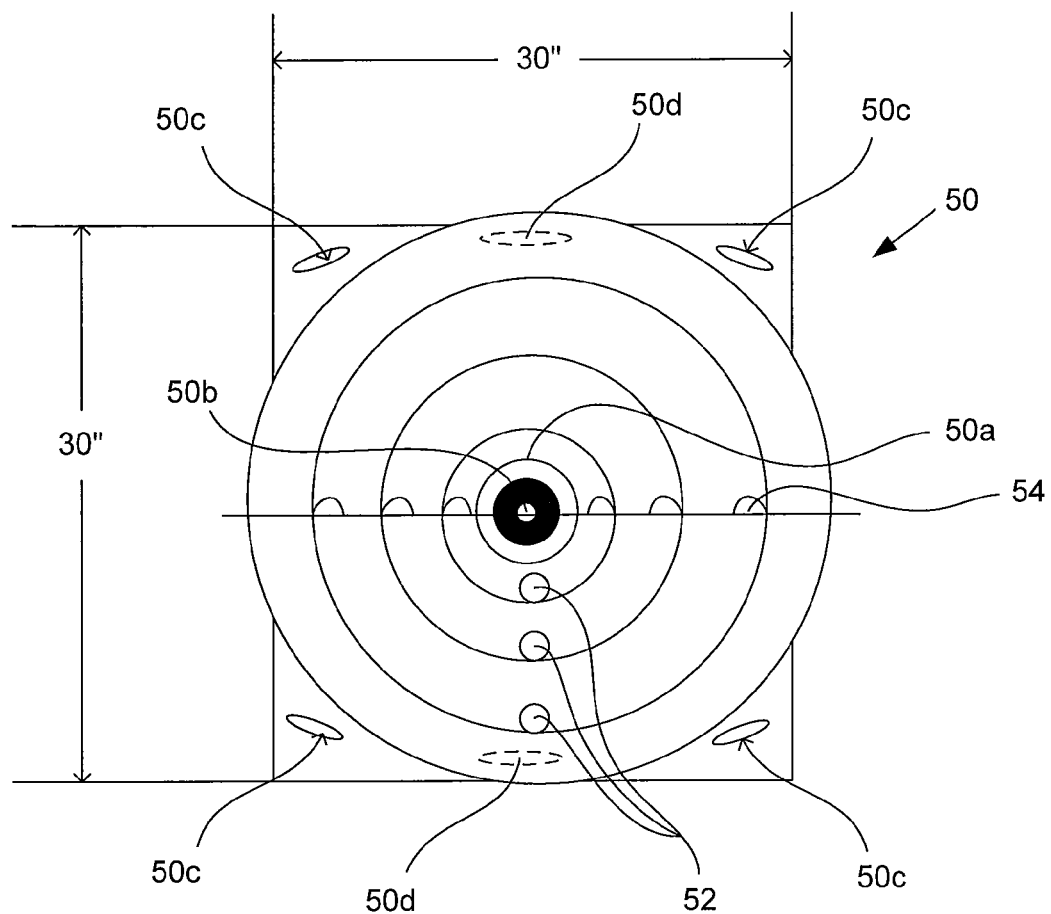
FIGS. 3a and 3b show various views of an embodiment of a base according to the present invention.
Figure 3B:
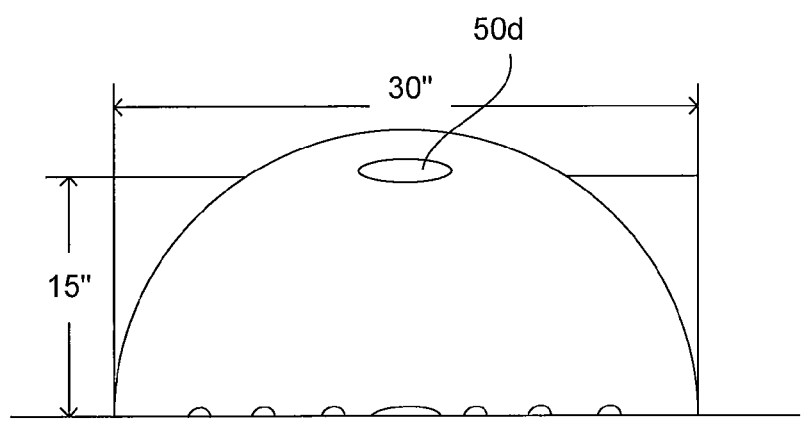

FIG. 3a shows a top view of one embodiment of a base according to the present invention. Base 50 defines a centerpiece-position 50a for positioning the centerpiece (not shown in this figure). Centerpiece-position 50a also preferably includes a first hole 50b, for use in securing the centerpiece to the base. Base 50 also preferably defines at least a second hole 52 configured to receive a hole spike (not shown in this figure). The at least second hole will preferably be placed radially outwardly from the centerpiece at a distance that allows the second hole to overlap with the lug hole on a rim. For example, preferably distances may be 12 inches, 13 inches, and/or 14. In many embodiments it will be preferable to include a additional rim holes, as shown, such as a third and forth hole, so that a single base may accommodate a variety of rim sizes. Base 50 also preferably includes hinges, e.g., hinges 54, which allow base to fold upon itself for storage or portability as seen in FIG. 3. In some embodiments, the base will have an opened footprint of about 30 inches squared. Base 50 may also have foot positions 50c and handholds 50d.

Figure 4A:
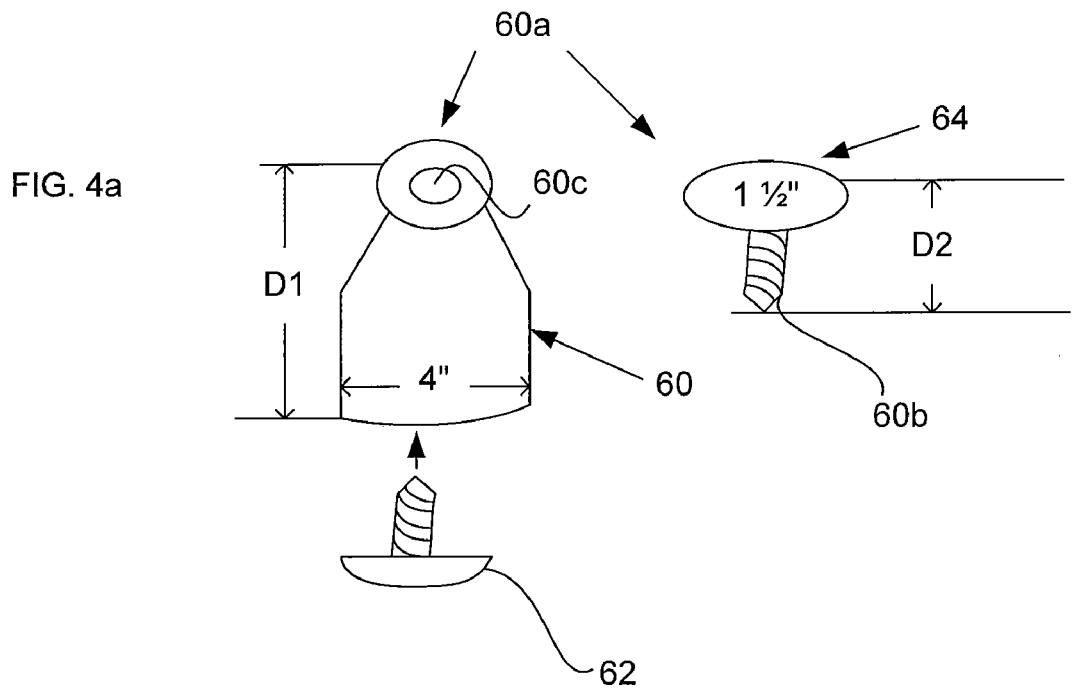
FIG. 4a shows one embodiment of a centerpiece according to the present invention.

FIG. 4a shows an isolated view of one embodiment of a centerpiece, centerpiece 60. Preferably, centerpiece 60 is configured to be positioned on a centerpiece-position of the base, e.g., similar to discussed above. Centerpiece 60 is releasably securable to the base, preferably by positioning screw 62 through the first hole of a base. As is visible, centerpiece 60 includes lever-attachment 60a positioned toward the upper part of centerpiece 60. Preferably, lever-attachment 60a includes rod 60b designed to engage an aperture of a primary lever, e.g., apertures 22 shown in FIGS. 2a-2c. In the embodiment depicted, rod 60b is the rod of screw 62 and centerpiece 60 defines recess 60c for receiving screw 64. In this embodiment, a primary lever can be attached to the centerpiece by positioning screw 62 through an aperture of the primary lever and into recess 60c of centerpiece 60. In some embodiments, centerpiece 60 will have a height D1 of about 10 inches and a diameter of about 4 inches. Also, as seen, it may be preferable to have the center piece taper or narrow toward its upper end to a diameter of about 2 inches. Preferably, recess 60c has a diameter of about 0.5. Preferably, screw 64 has a head size of about 1.5 inches and a rod length of about 3.5 inches. It may also be desirable to use a screw 64 weighing about 1 pound. Bottom screw may have about a 1 inch head, about a 4 inch length and weigh about 1 pound.

Figure 4B:
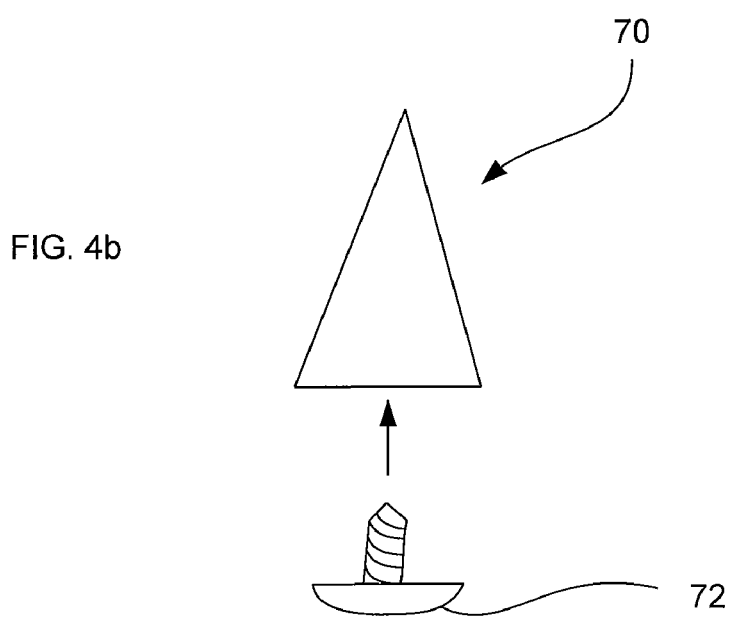
FIG. 4b shows one embodiment of a hole spike according to the present invention.

FIG. 4b shows one embodiment of a hole spike 70 and hole spike screw 72. Hole spike 70 is releasably securable the base at hole spike holes, e.g., the second, third or forth holes discussed above, through the use of screw 72. When assembled with the base and centerpiece, the hole spike is configured to engage a rim positioned on the centerpiece, thereby preventing the rim from rotating relative to the base. In preferred embodiments, hole spike 70 will have a height of about 8 inches, a base diameter of about 2 inches and a top diameter of about 0.25 inches. Similarly, in preferred embodiments, spike 70 will be constructed of rigid plastic with a steel coat, to have a weight of about 3 pounds.

Figure 5:
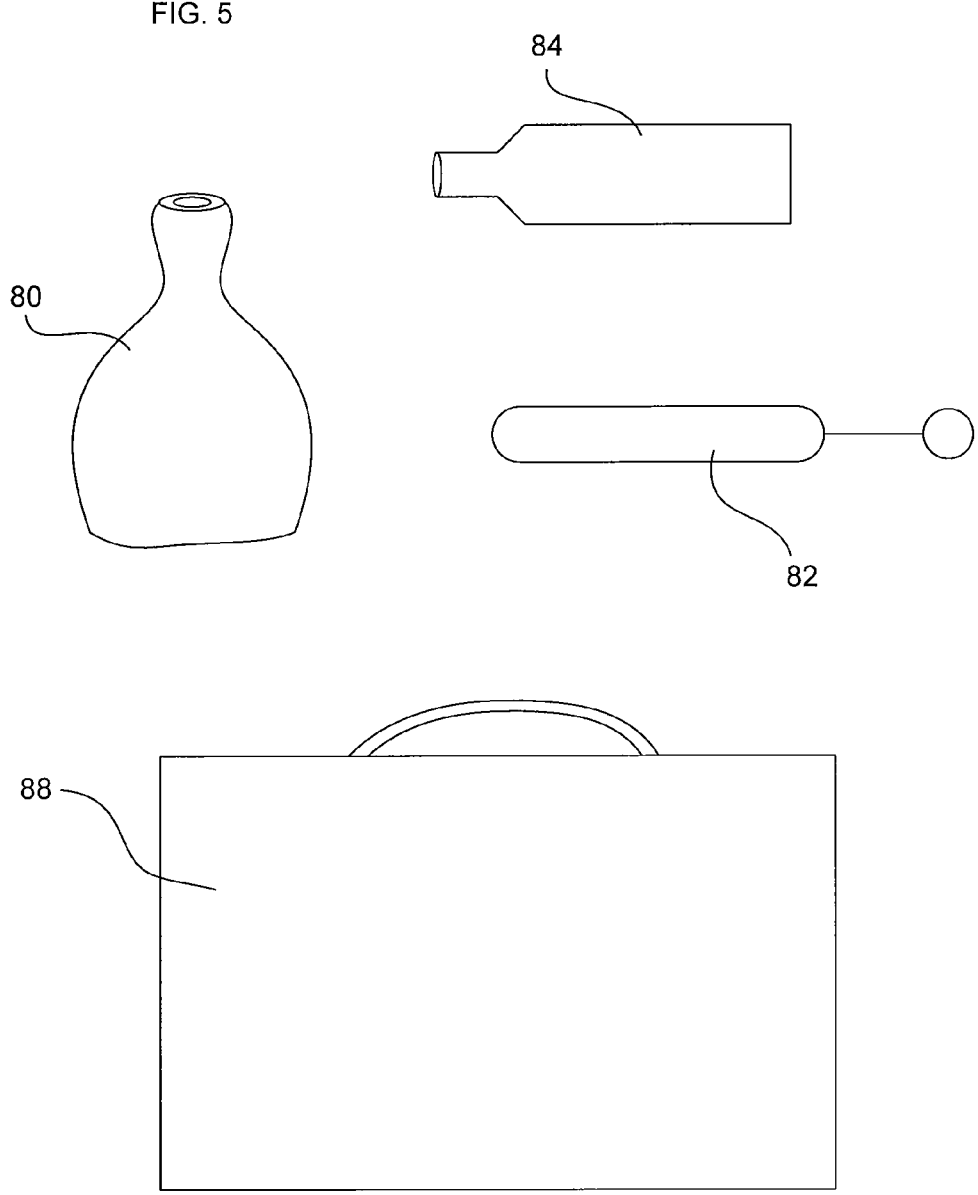
FIG. 5 shows embodiments of various items, which may be used to practice the present invention.

FIG. 5 shows other components, which may be useful for the present invention. For example, systems or kits of the present invention may include a soap solution 82 and accompanying application brush 82. It may also be desirable to include tire stem center remover 84. Further, the various components discussed above may be stored and carried in carrying bag 88.

Referring back, primarily to FIGS. 1a, 1b, and 1c, in operation, base 10 is placed on the ground. Centerpiece 12 is positioned on the base and secured to the base. Hole spike 16 is secured to base 10 at a location that corresponds to the tire to be placed on system 2. Tire 4 is positioned on the system. To position tire 4, place the center hole of rim 6 onto centerpiece 12, and place hole spike 16 through rim hole/lug hole 4a to ensure a firm fit. A tire stem remover, (see FIG. 5), can be used to remove the stem of the tire (not shown) and release air from the tire. Pressure may be applied to the tire, e.g., by walking around the tire, to facilitate air removal. Walking around the tire may also loosen the tire from the rim.

A secondary lever (refer to FIG. 2d) can be further used to facilitate separation of the tire from the rim. When using a secondary lever 40, hook-like portion 40a is inserted onto the edge of the rim, and by applying downward force to handle 40b, press-down bar 40c applies downward pressure to the tire, thereby further separating the tire from the rim. Continue this process around the rim. Once the tire is loose, the press-down lever may be removed. The rim edge may now be saturated with a soap solution for lubrication.

Space is created between tire 4 and rim 6. Many may find it preferable to use the tire break-away bar lever (as shown in FIG. 2a) for this step. The hook-like point 24a of the tire break-away bar lever is inserted in-between rim and tire and the rim fitting 24c can be inserted into the inner edge of rim 6. By applying downward force to the tire break-away bar lever, space is easily created between the tire and rim.

Into the space created between the tire and the rim, the tire interface 24 of a primary lever 20 is inserted. Preferably, the primary lever will be the tire separation bar shown in FIG. 2c. Also it is preferable to position the edge of rubber of the tire into the space created between hook 24e and thumb 24f of the tire separation bar. The primary lever 14 is then secured to centerpiece 12. By rotating primary lever 14 in the direction of arrow 18, for example, the upper side of tire 4 can be removed from the upper edge of rim 6.

Next, lift tire 4 until the bottom side of tire 4 contacts the top side of rim 6 and create space between the bottom portion of the tire and the top portion of the rim. Again, many may find it preferable to use the tire break-away bar lever (as shown in FIG. 2a) for this step. The hook-like point 24a of the tire break-away bar lever is inserted in-between rim and tire and the rim fitting 24c can be inserted into the inner edge of rim 6. By applying downward force to the tire break-away bar lever, the desired space is easily created between the tire and rim. Insert another primary lever, e.g., the tire separator bar shown in FIG. 2c, into the created space. Connect primary lever 14 to centerpiece 12 and rotate to completely remove the tire from the rim.

Some may desire to use multiple primary levers to facilitate tire removal or application. For example, some may desire to place additional primary levers, e.g., those shown in FIG. 2b, in between the tire and the rim to facilitate removal.

Systems of the present invention may also be used to replace tires or put on new tires. In operation, preferably the rim edge is saturated with soap solution. The tire is then placed in a half-cocked position on the rim. After connecting the tire separation bar, insert the exposed edge of tire rubber into the space created between hook 24e and thumb 24f. Press down on the tire and rotate the lever, applying the section of the tire to the rim. The tire can then be inflated.

Numerous characteristics and advantages have been set forth in the foregoing description, together with details of structure and function. The novel features are pointed out in the appended claims. The disclosure, however, is illustrative only, and changes may be made in detail, especially in matters of shape, size, and arrangement of parts, within the principle of the invention, to the full extent indicated by the broad general meaning of the terms in which the general claims are expressed.

The invention claimed is:

1. A system for removing a tire from a rim, said system comprising:
   a substantially flat base, wherein said substantially flat base includes a hinge configured to allow said base to fold upon itself;
   a centerpiece configured to attach to said base;
   a primary lever having a tire-interface portion at one end, a handle at the opposite end, and a centerpiece-attachment in between said tire-interface and said handle, wherein said centerpiece-attachment is configured to attach to said centerpiece in a manner that allows said primary lever to rotate relative to said centerpiece; and
   at least one hole spike attached to said base and configured to engage at least one rim hole of a rim positioned on said center piece, thereby preventing said rim from rotating relative to said base.

2. The system of claim 1, wherein said centerpiece includes a lever-attachment positioned toward the upper part of said centerpiece, and wherein said centerpiece-attachment of said lever releasably attaches to said lever-attachment of said centerpiece.

3. The system of claim 1, wherein the distance between said tire-interface and said centerpiece-attachment of said lever is sufficient to allow said tire-interface to contact a tire positioned on said base when said centerpiece-attachment of said lever is attached to said centerpiece.

4. The system of claim 1, further including a secondary press-down lever comprising:
   a hook-like portion at one end, said hook-like portion being configured to engage an edge of a rim;
   a handle at the opposite end; and
   a press-down bar attached to said lever on the opposite side of said hook-like portion; whereby when said hook-like portion has engaged a rim, and when downward force is applied to said handle, said press-down bar will push down into said tire, thereby separating said tire from said rim.

5. The system of claim 1, wherein said substantially flat base defines a first hole configured to receive a centerpiece screw.

6. The system of claim 5, wherein said base defines a second hole configured to receive said hole spike.

7. The system of claim 6, wherein said base defines a third hole configured to receive a hole spike, wherein said third hole is positioned substantially outwardly from said second hole.

8. The system of claim 1, wherein said centerpiece includes a bottom screw for securing said centerpiece to said base.

9. The system of claim 1, wherein said centerpiece-attachment of said primary lever is an aperture defined in said primary lever.

10. The system of claim 9, wherein said lever-attachment of said centerpiece includes a rod designed to engage said aperture of said centerpiece-attachment.

11. The system of claim 10, wherein said rod is the rod of a screw, and wherein said lever-attachment of said centerpiece further defines a recess for receiving said screw, thereby allowing said primary lever to be attached to said centerpiece by positioning said screw through said aperture of said primary lever and into said recess of said centerpiece.

12. A system for removing a tire from a rim, said system comprising:
   a substantially flat base defining at least a first hole and a second hole, wherein said substantially flat base includes a hinge configured to allow said base to fold upon itself;
   a centerpiece configured to be positioned above said first hole of said base;
   at least one hole spike configured to be attachable to said base through said second hole and configured to engage at least one rim hole of a rim positioned on said center piece, thereby preventing said rim from rotating relative to said base;
   a primary lever having a tire-interface portion at one end, a handle at the opposite end, and a centerpiece-attachment in between said tire-interface and said handle,
      wherein said centerpiece-attachment is configured to releasably attach to said centerpiece in a manner that allows said primary lever to rotate relative to said centerpiece, and
      wherein the distance between said tire-interface and said centerpiece-attachment of said lever is sufficient to allow said tire-interface to contact a tire positioned on said base when said centerpiece-attachment of said lever is attached to said centerpiece; and
      wherein said lever can be rotated relative to said centerpiece by applying force to said handle.

13. The system of claim 12, further including a secondary press-down lever comprising:
   a hook-like portion at one end, said hook-like portion being configured to engage a tire rim hole;
   a handle at the opposite end; and
   a press-down bar attached to said lever on the opposite side of said hook-like portion; whereby when said hook-like portion has engaged a rim, and when downward force is applied to said handle, said press-down bar will push down into said tire, thereby separating said tire from said rim.

14. The system of claim 12, wherein said centerpiece-attachment of said primary lever is an aperture defined in said primary lever.

15. The system of claim 14, wherein said lever-attachment of said centerpiece includes a rod designed to engage said aperture of said centerpiece-attachment.

16. The system of claim 15, wherein said rod is the rod of a screw, and wherein said lever-attachment of said centerpiece further defines a recess for receiving said screw, thereby allowing said primary lever to be attached to said centerpiece by positioning said screw through said aperture of said primary lever and into said recess of said centerpiece.

* * * * *